United States Patent [19]

Anderson

[11] Patent Number: 4,826,106
[45] Date of Patent: May 2, 1989

[54] ADVANCED COMPOSITE AIRCRAFT COWL

[75] Inventor: Robert E. Anderson, Huntington Station, N.Y.

[73] Assignee: Grumman Aerospace Corporation, Bethpage, N.Y.

[21] Appl. No.: 16,066

[22] Filed: Feb. 18, 1987

[51] Int. Cl.$^4$ .......................... B64D 33/00; F01N 1/24
[52] U.S. Cl. ............................... 244/117 R; 181/214; 181/222; 181/292; 244/1 N; 244/53 R
[58] Field of Search ................ 244/133, 123, 117 R, 244/53 R, 54, 1 N; 181/213, 214, 215, 222, 284, 288, 290, 291, 292; 239/265.11, 265.13

[56] References Cited

U.S. PATENT DOCUMENTS

| | | | |
|---|---|---|---|
| 3,768,760 | 10/1973 | Jensen | 244/123 |
| 3,775,238 | 11/1973 | Lyman | 244/123 |
| 3,873,654 | 3/1975 | Smith | 244/123 |
| 3,978,256 | 8/1976 | James | 244/133 |
| 4,111,081 | 9/1978 | Hilliard et al. | |
| 4,137,992 | 2/1979 | Herman | |
| 4,235,303 | 11/1980 | Dhoore et al. | |
| 4,294,329 | 10/1981 | Rose et al. | |
| 4,313,524 | 2/1982 | Rose | |
| 4,344,995 | 8/1982 | Hammer | 244/117 R |
| 4,533,098 | 8/1985 | Bonini et al. | 244/117 R |
| 4,585,189 | 4/1986 | Buxton | 244/54 |

*Primary Examiner*—Galen Barefoot
*Attorney, Agent, or Firm*—Richard G. Geib; Daniel J. Tick; Bernard S. Hoffman

[57] ABSTRACT

An aircraft cowl, and in particular a translating cowl, used as a component of a thrust reverser, formed of at least one one-piece bondment cured in a single operation. Preferably, a one-piece inner bondment and a one-piece outer bondment fastened together at a joining region. The bondments have constant density cores and tapered closures. Acoustically absorbing materials are part of the lay up for one of the bondments and are integrally cured therein.

27 Claims, 8 Drawing Sheets

ADVANCED COMPOSITE AIRCRAFT COWL

BACKGROUND OF THE INVENTION

This invention relates to a composite aircraft cowl. It also relates to an aircraft cowl useful as a "transcowl" or the translating cowl component of a thrust reverser which advantageously utilizes the properties of composite materials in a simple design having few structural components.

The use of composite materials in many aircraft components has served to replace heavy metallic components with light weight equivalents which provide the same, if not greater, strength and/or stiffness. However, the substitution of composite materials for metals has generally taken place on a component by component basis; that is, a substitution for a metallic component is made with a composite component having the same basic geometry and required mechanical properties. The components must then be assembled in a manner analogous to the assembly of the metallic components. Such assembly is difficult and costly, requires complex fixturing, and often results in a structure which must be custom "trimmed" to fit together properly. Further, such fitting together of many components often supports and transfers stress in the manner intended for metallic components, rather than along the best stress support and transfer paths for composite components. For example, composite structures generally have laminated graphite/epoxy cloth layers over a honeycomb core. The graphite/epoxy layers have little resistance to interlaminar shear, but support tension along the direction of the fibers, while the honeycomb core supports compressive stresses perpendicular to the plane of the core, but is very poor in supporting shear in the plane of the core.

An additional disadvantage of fitting together a large number of components is that many fasteners must be used. This decreases the potential cost and weight advantages of using composites.

The above shortcoming of existing composite structures are especially evident in designs for transcowls. Some designs require assembly of up to four hundred separate structural components. Such designs often do not meet the expected weight criteria imposed as a design goal. Thus, aircraft weight and fuel consumption is increased.

SUMMARY OF THE INVENTION

It is a principal object of the invention to provide a composite aircraft cowl which is simple in design and requires the assembly of few components.

It is another object of the invention to provide a composite aircraft cowl which advantageously uses the composite materials therein to support and transfer stresses in directions and manners most appropriate for composite materials.

It is still another object of the invention to provide a composite aircraft cowl with an acoustic liner which efficiently and effectively minimizes jet noise.

It is an additional object of the invention to provide a composite aircraft cowl wherein the acoustic liner is integrally bonded into the structure of the cowl.

In accordance with the invention an aircraft cowl comprises at least one bondment formed as a one-piece composite structure having a honeycomb core and composite layers over at least one side of the core. The bondment has a tapered closure about at least a portion of the periphery thereof. The core is of constant density throughout.

The cowl preferably comprises an inner bondment formed as a one-piece composite structure, an outer bondment formed as a one-piece composite structure and fastening means for fastening the inner bondment to the outer bondment. Mounting means are provided to mount the cowl to an aircraft, and in particular to an engine of the aircraft, so that the cowl can be caused to translate in the longitudinal direction of the engine.

The tapered edge closure comprises a tapered region of the core at an edge thereof, at least one skin layer of composite material on each side of the core, and a plurality of composite edge layers running parallel to and reinforcing the at least one skin layer by extending a predetermined distance from the edge.

The invention is also directed to a method for manufacturing an aircraft cowl comprising the steps of forming a first one-piece composite bondment, forming a second one-piece composite bondment, and assembling the first one-piece bondment to the second one-piece bondment to form the cowl. At least one of the bondments is formed in a single curing operation. Acoustically absorbing material is integrally bonded to at least one surface of one of the bondments.

BRIEF DESCRIPTION OF THE DRAWINGS

In order that the invention may be more readily carried into effect, reference is made to the attached drawings, in which.

DETAILED DESCRIPTION OF THE PREFERRED EMBODIMENTS

While the present invention is described herein with reference to a transcowl, it will be understood that the invention is applicable to aircraft cowls generally.

Figure 1:
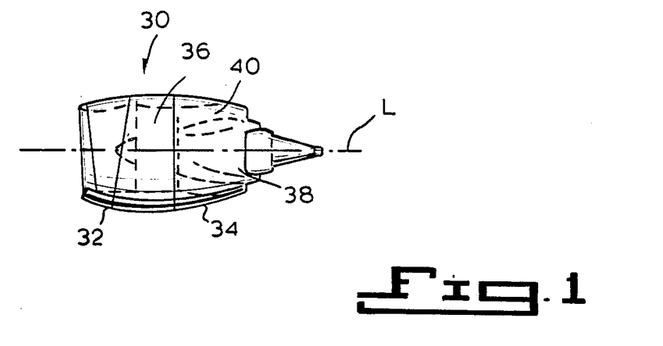
FIG. 1 is a schematic view of a fan type gas turbine engine.

FIG. 1 schematically illustrates a jet engine assembly 30 used to generate rearward thrust for propulsion and forward thrust for braking. A nacelle 32 and an annular cowling 34 surround an engine. An engine fan 36 provides air to jet turbine 38 and to fan bypass passage 40. Cowling 34 is mounted so as to permit translation rearwardly from the normal rearward thrust generating position shown, in a direction parallel to longitudinal engine axis L to open a passage (not shown in FIG. 1) between cowling 34 and nacelle 32. The translation of cowling 34 simultaneously causes blocker doors (not shown in FIG. 1) to pivot into the path of air traveling along bypass passage 40, and to divert the flow of air in passage 40 so that it is directed forwardly through the passage between cowling 34 and nacelle 32 to provide forward thrust for braking.

Figures 2, 3:
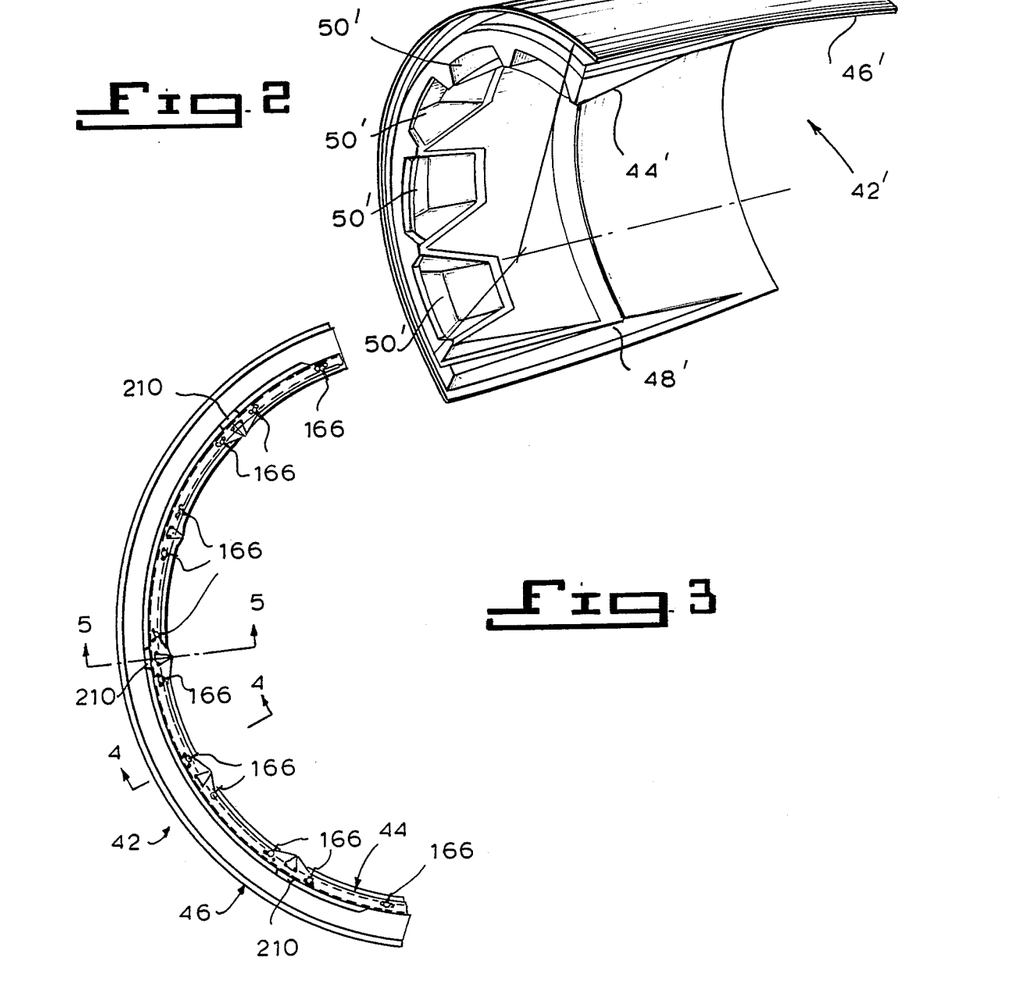
FIG. 2 is a simplified, conceptual, isometric view of an embodiment of a transcowl according to the invention.
FIG. 3 is an end view of another embodiment of a transcowl according to the invention.

Referring to FIG. 2, cowling 34 of an engine is formed of two assemblies or cowls 42'. While a right hand assembly is shown in FIG. 2, it will be understood that both a right hand assembly and a left hand assembly (the latter being essentially a mirror image of the right hand assembly) are required for a complete cowling 34. Each cowl 42' is formed of an inner bondment 44' and an outer bondment 46' which are fastened together at a joining region 48'. The inner bondment includes recesses 50' for the blocker doors and pivots (not shown) in FIG. 2) for permitting the blocker doors to pivot during translation of cowl 42'. In FIG. 2 outer bondment 46' is longer than inner bondment 44' in the direction of the longitudinal axis of the engine on which cowl 42' is to be mounted. Outer bondment 46' is therefore reinforced at joining region 48'.

Figure 4:
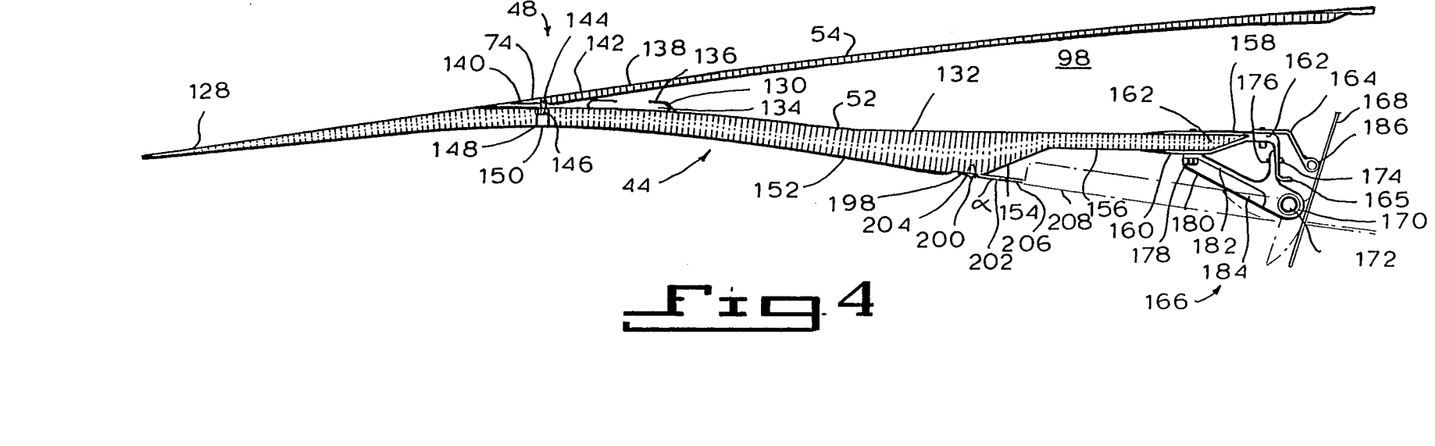
FIG. 4 is a cross-sectional view, taken along the lines 4—4, of FIG. 3.
Figure 5:
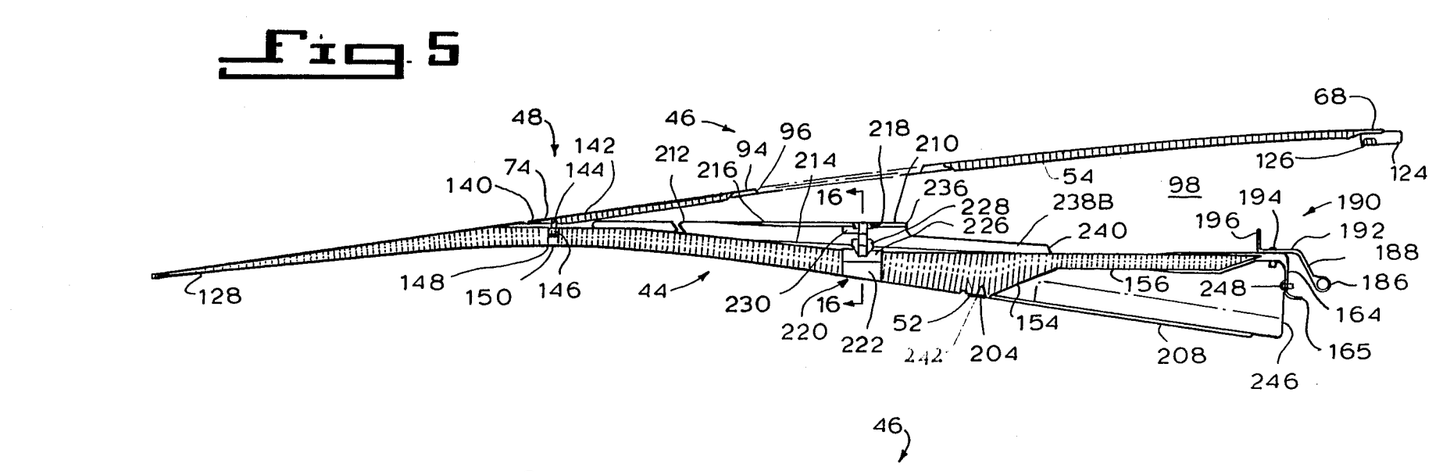
FIG. 5 is a cross-sectional view, taken along the lines 5—5, of FIG. 3.

In the embodiment of the invention shown in FIG. 3, FIG. 4 and FIG. 5, the inner bondment 44 extends along the direction of the engine axis for a greater length than the outer bondment 46. Inner bondment 44 is thus reinforced at region joining 48 as more fully explained below.

Figure 9:
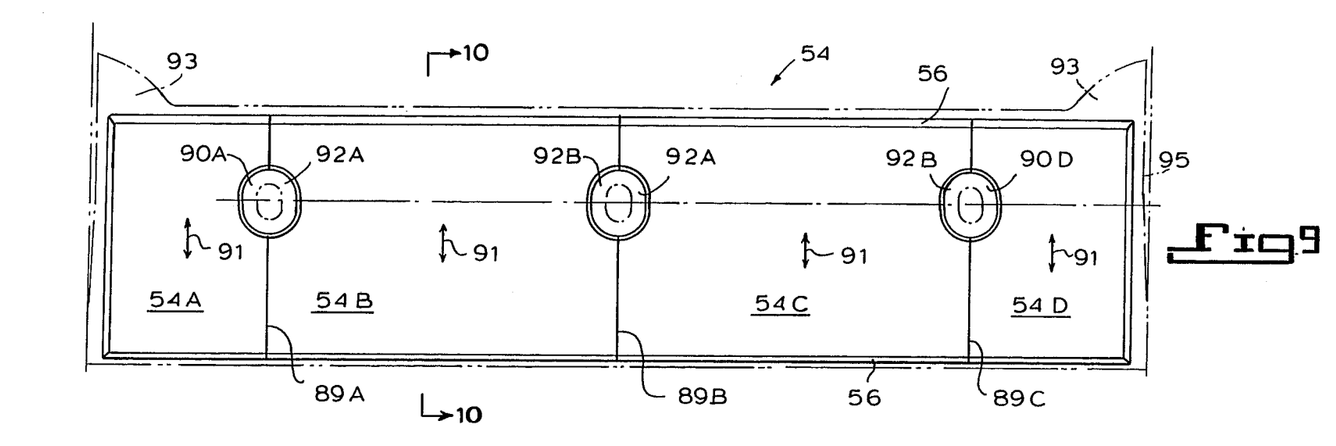
FIG. 9 is a plan view of the outer bondment core of the transcowl of FIG. 3.
Figure 10:
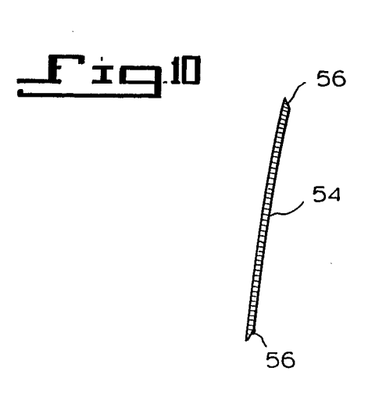
FIG. 10 is a cross-sectional view, taken along the lines 10—10, of FIG. 9.

Inner bondment 44 and outer bondment 46 each contain, respectively, cores 52 and 54. Core 54 is formed from 3.5 lb/cubic foot flexcore (a honeycomb core) manufactured by Hexcel Corp. from material sold under the NOMEX TM trademark by DuPont. Since core 54 is formed of a flexible material, it is only necessary to lay the material out in a flat surface in the form as shown in FIG. 9, to chamfer the periphery 56 as shown in FIG. 10, and to drape the material in a tool. Further, a single density (uniform stiffness) core is used throughout the outer bondment. Core 52 of the inner bondment is also of uniform density throughout but may be of a different core density, e.g. 4.5 lbs/cubic foot.

In view of core 54 of outer bondment 46 (and core 52 of inner bondment 44) being of uniform density (and stiffness), a tapered edge closure is used. The periphery is reinforced by increasing the number of layers of graphite/epoxy cloth (in combination with judiciously placed graphite/epoxy unidirectional tape layers) which make up the outer skin of the outer bondment 46 while tapering the core.

Sandwich panels made of filament/matrix composite materials that incorporate tapered edge closures as opposed to abruptly terminated square edge closures, are more cost efficient to produce and provide equal or better structural efficiency for load levels typically found in transcowl structures. Appropriate use of pre-impregnated advanced composite materials eliminates the need for producing pre-contoured facesheets. Instead, the shape of the core and its properties are the major factors in defining the final cured shape. Tolerance and tooling problems associated with producing a contoured metal panel are obviated if all of the components are fitted together while in their pliable uncured state and compacted as one unit during the heating/pressurizing process.

By cutting a taper on the edge of the core and sandwiching it between tapered thickness facesheets, optimum redistribution of edge loads in an advanced composite tapered edge closure is accomplished. Higher density core is not required along the edge. Instead, the edge shears are accommodated in the tapered thickness build-ups of the inner and outer facesheets acting partially as plates and partially as a large triangular truss with the core serving as one of the legs of the triangle but spread out from one end of the ramp to the other.

Various combinations of ramp angle, core density, facesheet thickness and tapers, the ribbon direction of the core, as well as the core height and the edge fixity of the facesheet laminae against the tool surface can be used, within limits, to optimize the performance of the tapered edge closure. The above parameters also determine whether or not the tapered edge closure can be formed in the curing process in the first place.

The influence of each of the above six parameters is outlined below:

1. As the ramp angle of the core increases the core in the tapered ramp edge becomes more susceptible to collapse under autoclave curing pressure.

2. As the density of the core is increased the ramp angle can be increased.

3. As the facesheet thickness is increased the ramp angle can be increased but only gradually and up to a point.

4. Orienting the core ribbon direction perpendicular to the panel edge permits the use of higher ramp angles. Core ribbon direction parallel to the panel edge permits only lower ramp angles.

5. Thicker cores permit only shallower ramp angles. Thinner cores permit steeper ramp angles.

6. Fixing the free edges of the plies to the tool base prevents lateral motion of the plies during the curing process and inhibits core collapse in the vicinity of the ramp, thus permitting the use of higher ramp angles.

Figure 6:
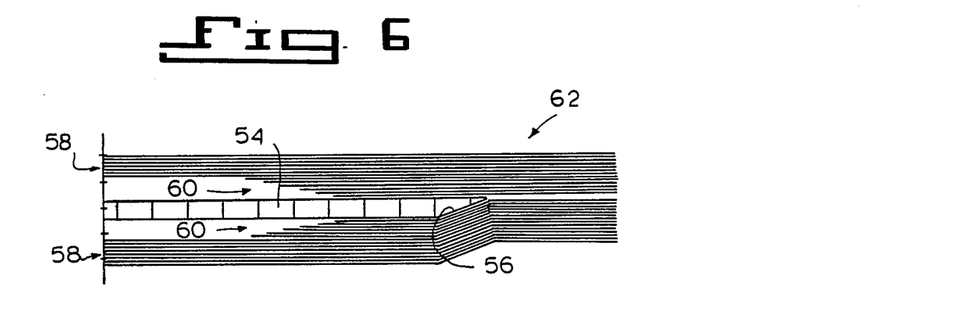
FIG. 6 is a schematic, cross-sectional view of the lay up used on the top and bottom edge of the outer bondment of the transcowl of FIG. 3.
Figure 11:
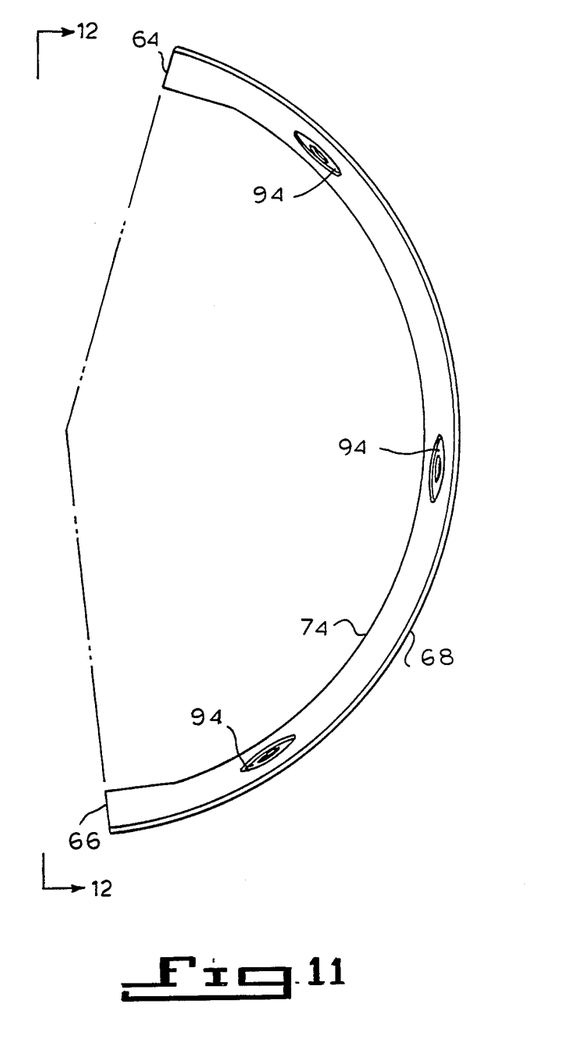
FIG. 11 is a simplified front elevational view of a left hand outer bondment of the transcowl of FIG. 3.

While the number of layers will vary from design to design based on the loads to be carried, FIG. 6 shows schematically the manner in which six skin layers 58 are used on each side of core 54 in regions away from the periphery and six edge layers 60 are added on each side of core 54 to provide a stiff edge structure, shown generally as 62, of increasing thickness as the top and bottom edges are approached. The edge layers 60 are of tapering length; that is the layer closest to core 54 (the inner most layer) is shortest, and each successive layer slightly longer with the layer adjacent the innermost skin layer 58 being longest. Other configurations are of course possible, that is, the shorter plies 60 can be interleaved between the skin layers 58 but the graded lengths of layers 60 are arranged so as to provide a graduated increase in thickness from panel interior regions to panel edge. The skin layers, and the edge layers extend beyond the chamfered periphery 56 of core 54 so that the top and bottom edges (designated as 64 and 66, respectively, in FIG. 11 and FIG. 12) of outer bondment 46 have no core layer, but are formed only of twenty four layers of graphite/epoxy cloth.

Figure 7:
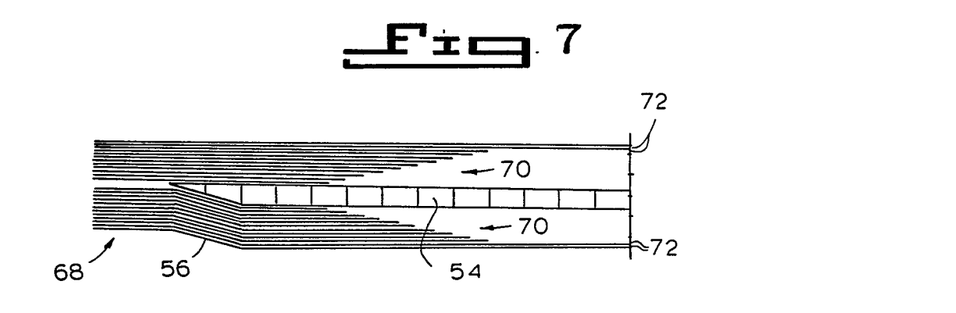
FIG. 7 is a schematic, cross-sectional view of the lay up used in the forward edge of the outer bondment of the transcowl of FIG. 3.

FIG. 7 illustrates, schematically, the lay up for the forward edge 68 of outer bondment 46. The principles used are identical to those implemented for the top and bottom edges of FIG. 6. Ten edge layers 70 of progressively longer length when progressing outwardly from core 54, are provided on each side of core 54. Two skin layers 72 which extend inwardly away from forward edge 68 are also provided.

Figure 8:
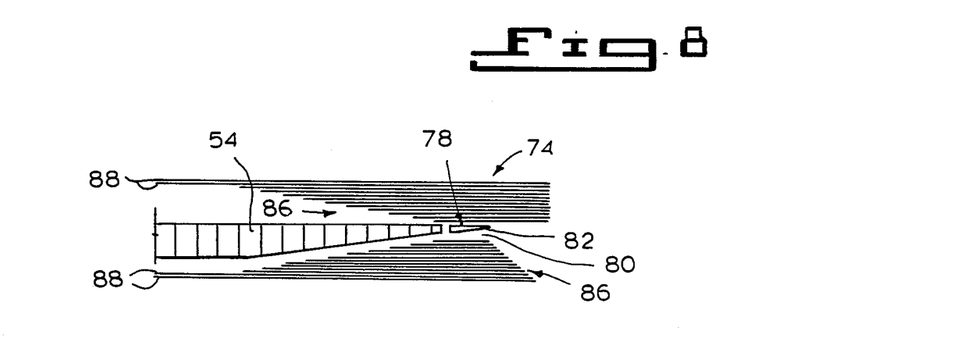
FIG. 8 is a schematic, cross-sectional view of the lay up used in the aft edge of the outer bondment of the transcowl according of FIG. 3.

The lay up for the aft edge 74 of outer bondment 46 is illustrated in FIG. 8. Again, the principles of construction are similar to that of the top and bottom edges illustrated in FIG. 6. However, core 54 is not tapered to a relatively sharp edge, as in FIG. 6 and FIG. 7, but is instead cut off to form a narrow surface 76 perpendicular to the plane of core 54. An elongate filler member 78 having a first portion 80 of rectangular cross section and a second portion 82 of tapering (triangular) cross section formed of a one-piece graphite/epoxy resin composite has a surface 84 of substantially the same dimensions as surface 76 and is placed in the lay up so that surfaces 76 and 84 are in direct contact with one another. Ten progressively longer edge layers 86 of graphite/epoxy cloth are placed on each side of the assembly of core 54 and filler member 82. Two skin layers 88 cover the assembly.

Filler member 82 serves to stiffen aft edge 74 and provides a region through which a fastener hole may be drilled for the purpose of attaching outer bondment 46 to inner bondment 44, as more fully described below.

As illustrated in FIG. 9, core 54 may be formed of four core sections 54A, 54B, 54C and 54D (all of the same density) tied together by three core splices 89A, 89B and 89C. The ribbon direction is as shown by arrows 91. A single oval cut out 90A and 90D is formed in core sections 54A and 54D, respectively. Two cut outs 92A and 92B are formed in each of core sections 54B and 54C. The edge of core section 54A, 54B, 54C and 54D defining these cut outs are tapered in a manner similar to that shown in FIG. 6 and FIG. 7 and additional edge layers of graphite/epoxy cloth and tape are included in the lay up to produce stiff oval edges members 94 each having a step 96 (FIG. 5) for receiving an access door (not shown). The removal of the access doors permits inspection of the region 98 between inner bondment 44 and outer bondment 46 when transcowl 42 is in service on an aircraft.

Figure 12:
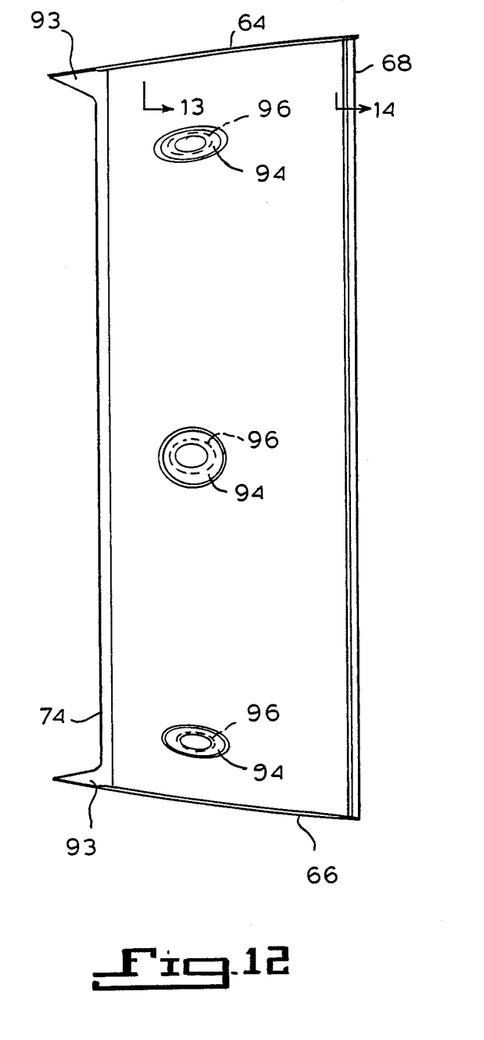
FIG. 12 is a simplified side elevational view of the outer bondment, taken along the lines 12—12, of FIG. 11.

As shown in FIG. 12, outer bondment 46 is provided with fairing extensions 93 extending from aft edge 74 in the vicinity of the top edge 64 and the bottom edge 66. Fairing extensions 93 serve to permit outer bondment 46 to parallel inner bondment 44 in the vicinity of the aft edge 74 where the shape of inner bondment 44 departs from that of a cylinder and is instead flattened somewhat (See FIGS. 22 and 23). Fairing extensions 93 are made of layers of graphite/epoxy cloth and tape and are bonded and cured in the same single operation during which outer bondment 46 is bonded and cured. The general shape of the outline of outer bondment 46 with respect to core 54 is represented by dotted line 95 in FIG. 9.

Outer bondment 46 is formed in a single autoclave operation wherein all of the components in the lay up described above are formed into a single (one piece) component. A composite (graphite/epoxy) tool, rather than a metallic tool, is used because of the greater dimensional stability provided, thus assuring that the part cured at temperature is closer to the desired final shape (contour) than is possible with metallic tools. A concave tool, the surface of which is treated with a release agent, is used to provide a good surface finish for the outer surface of outer bondment 46 which, in use, is covered with an appropriate finish and exposed to the flow of air. A pressure bag contacts the inner surface of outer bondment 46 which is not exposed to the flow of air and where surface finish is not as significant. The graphite/epoxy cloth layers are purchased in the pre-preg conditions (i.e., impregnated with an epoxy resin) which bonds the material together. The particular cloth is selected to have enough resin so that no additional adhesive layers are required and so that it is not necessary to bleed off any of the resin.

Figure 13:
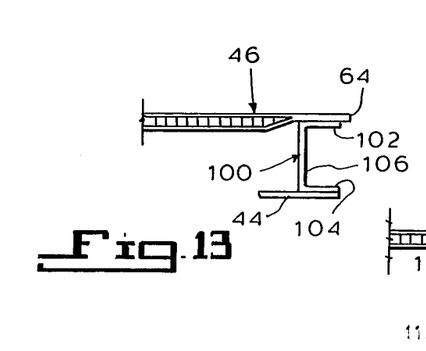
FIG. 13 is a fragmentary, cross-sectional view, taken along the lines 13—13, of FIG. 12.
Figure 19:
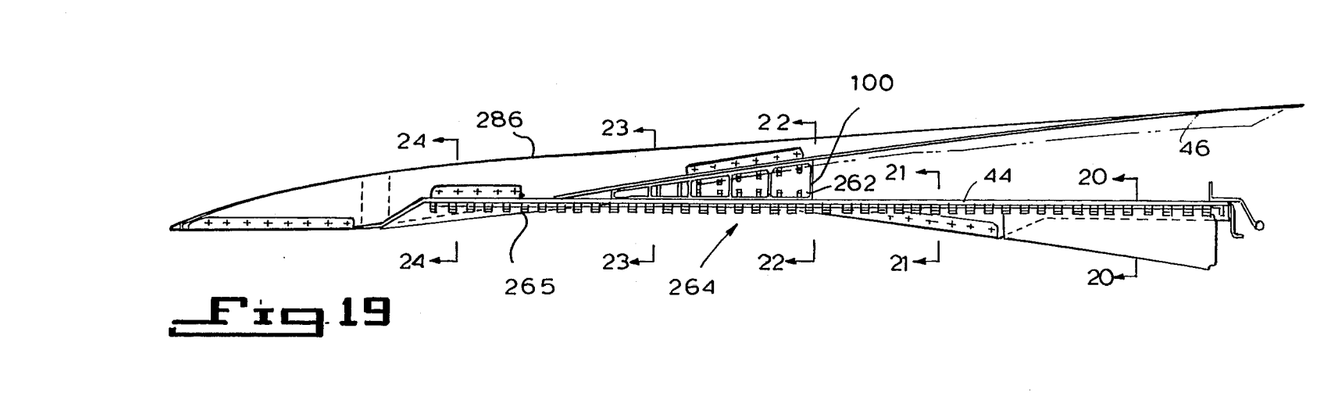
FIG. 19 is a side elevational view of the hinge area of the inner bondment of the transcowl of FIG. 3.
Figure 20:
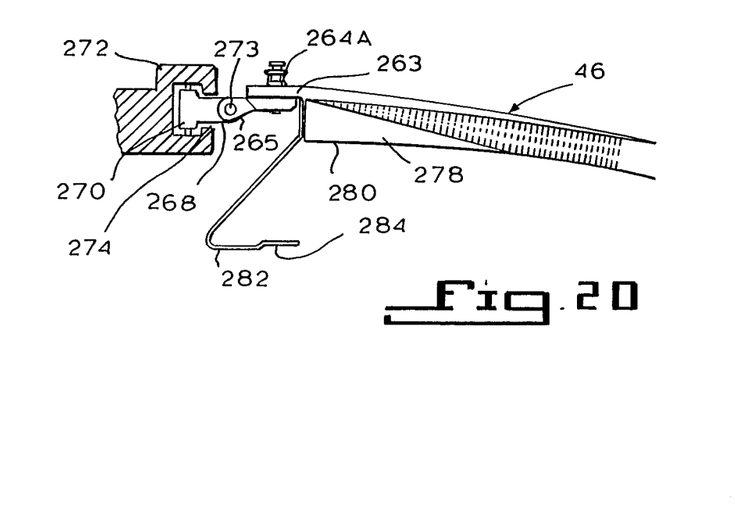
FIG. 20 is a fragmentary, cross-sectional view, taken along the lines 20—20, of FIG. 19.
Figure 21:
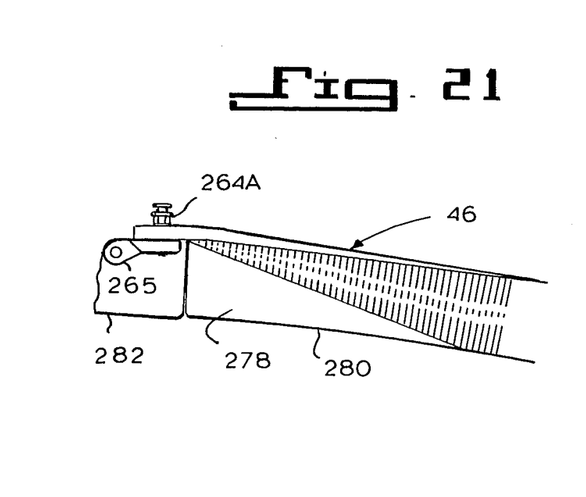
FIG. 21 is a fragmentary, cross-sectional view, taken along the lines 21—21, of FIG. 19.
Figure 22:
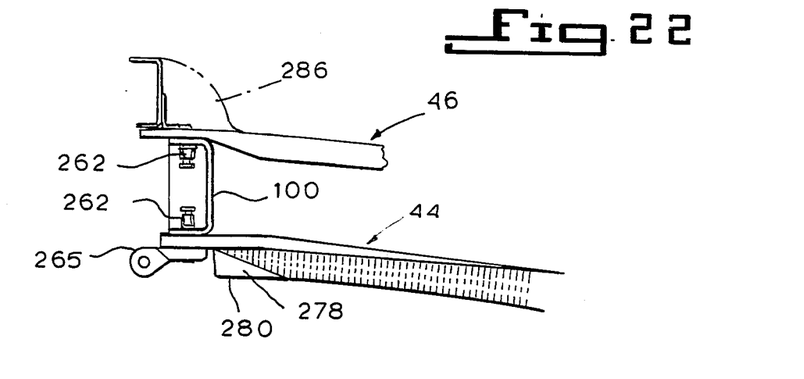
FIG. 22 is a fragmentary, cross-sectional view, taken along the lines 22—22, of FIG. 19.
Figure 23:
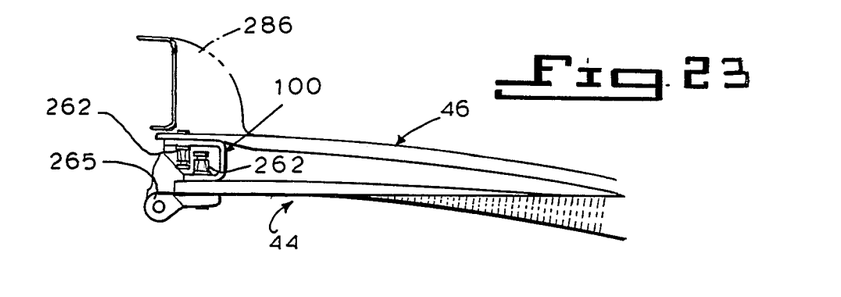
FIG. 23 is a fragmentary, cross-sectional view, taken along the lines 23—23, of FIG. 19.
Figure 24:
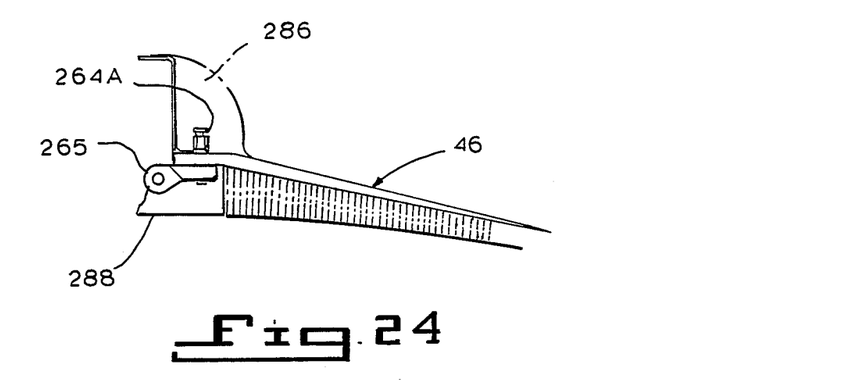
FIG. 24 is a fragmentary, cross-sectional view, taken along the lines 24—24, of FIG. 19.

As shown conceptually in FIG. 13, and in more detail in FIG. 19, FIG. 22 and FIG. 23, a portion of the length of upper edge 64 of outer bondment 46 is provided with a fitting 100 having a first planar portion 102 in contact with the inner surface of outer bondment 46, a second planar portion 104 in contact with the outer surface of inner bondment 44 and a third planar portion 106 connecting portions 102 and 104. Planar portion 102 is connected to edge 64 of outer bondment 46 and planar portion 104 is connected to an edge of inner bondment 44 by suitable fasteners (not shown). Fitting 100 transfers the vector sum of front to aft and the larger circumferential shear loads between the inner bondment 44 and outer bondment 46.

Figure 14:
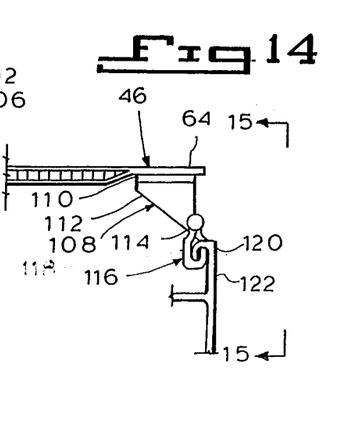
FIG. 14 is a fragmentary, cross-sectional view, taken along the lines 14—14, of FIG. 12.
Figure 15:
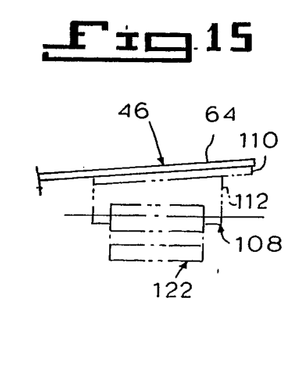
FIG. 15 is a fragmentary, elevational view, taken along the lines 15—15, of FIG. 14.

Referring to FIG. 14 and FIG. 15, a support fitting 108 is attached at the forward portion of top edge 64 by fasteners (not shown) extending through edge 64 and a planar portion 110 of support fitting 108 which has a surface in contact with the lower surface of edge 64. A second planar portion 112 of fitting 108 has a rotational connection region 114 which pivotally attaches to a guide member 116. Guide member 116 has an engaging portion 118 of C-shaped cross section which engages a corresponding C-shaped portion 120 of a beam assembly 122 which is fixedly attached to the structural portions of engine 30. Portion 120 of beam assembly 122 extends parallel to the longitudinal axis of the jet engine, and thus serves as a track along which transcowl 42 moves in response to motion of actuators (not shown) affixed at one end to the transcowl and at the other end of the actuators to the fixed engine structure and acting upon actuator supports more fully described below.

Several elastometric bumper assemblies 124 (FIG. 5) are affixed to forward edge 68 of outer bondment 46 to avoid damage to outer bondment 46 when it translates forward and mates with the rear of nacelle 32. Bumper assemblies 124 are each secured by a fastener (not shown) received in a cylindrical recess 126 and extending into forward edge 68.

Many of the principles of fabrication and construction techniques followed to produce outer bondment 46 also are used in the production of inner bondment 44.

Referring again to FIG. 3, FIG. 4 and FIG. 5, inner bondment 44 increases in thickness when going forward from the aft portion, where instead of NOMEX TM, a solid graphite/epoxy laminate member 128 of wedge shaped (triangular) cross section is used.

At selected locations around the circumference of inner bondment 44, a solid graphite/epoxy laminate stiffener 130 projecting radially outward from the outer skin laminates 132 of inner bondment 44 is provided. Stiffener 130 is formed with an opening 134. If desired, the top surface 136 of stiffener 132 may have an opening 138 to provide access for inspection.

Stiffener 136 has a short shoulder 140 which along with sloping surface 142 defines an annular recess extending in the circumferential direction of inner bondment 44. The aft portion of outer bondment 46, including aft edge 74, is received in said recess. A series of fasteners 144, each extending through a hole in aft edge 74 and a corresponding hole in stiffener 132, serve to secure outer bondment 46 to inner bondment 44. Each fastener 144 is secured by a corresponding nut 146 received in a corresponding cored out cylindrical opening 148 in inner bondment 44. An injection molded insert 150, of, for example, polyethylene, is used to fill the portion of opening 148 not occupied by the end of fastener 144 and nut 146. This manner of attachment allows outer bondment 46 to be detached from inner bondment 44 for repair or replacement. Since the inside surface 152 of inner bondment 44 includes material which together with core 54 are needed to establish acoustic absorption properties, the use of fasteners results in a slight reduction in acoustic absorbing area. However, the area lost is quite small.

The thickness of core 52 continues to increase forward of stiffener 132 until an annular region at which core thickness is rapidly reduced thus defining a sloping surface 154. Surface 154 connects to a surface 156 which is parallel to outside surface 132 of inner bondment 44. The angle of incline $\alpha$ of surface 154 is a fairly critical item, as core 54 can not support much shear load. The maximum angle $\alpha$ that can be tolerated in the design is dependent on such factors as core density, the total length (or height) of the incline, etc. in a manner similar to that described above for tapered end closures.

Additional skin layers 158 and 160 of graphite/epoxy cloth are provided to increase the overall thickness of the surface laminate structure at the forward portions of outer surface 132 and inner surface 156, respectively. In contrast to the schematic lay up diagram shown in FIG. 6, FIG. 7 and FIG. 8, the longest edge layers are just over the skin layers defining surfaces 132 and 156, while each added layer is shorter, i.e., it terminates closer to the forward end of inner bondment 44.

The additional layers brought together forward of the tapered forward end 162 of core 52 form a horizontal forward edge 162A. Selected edge layers then extend to form a radial edge 164 extending perpendicularly from edge 162 (i.e., radially inward). These selected layers then extend in a direction parallel to edge 162 to define a forward flange 165. The advantage of this arrangement is that the layers may be adequately bonded and cured in a single operation as there are no surfaces extending so as to lock around a portion of the tool used (as would be the case, for example, if flange 165 extended aft from radial edge 164).

A series of twelve blocker door hinge fittings 166 support six blocker doors 168 pivotally at respective circular openings 170 in hinge fittings 166. Openings 170 in hinge fittings 166 receive integral cylindrical extension member 172 of blocker doors 168. Hinge fittings 166 are secured to inner bondment 44 by a fastener 174 extending through a hole or holes in radial edge 164 and a corresponding hole or holes in a vertical planar extension 176 of fitting 166. A fastener 178 extends through inner bondment 44 in the region of additional skin layers 158 and 160 and is received in a horizontal planar portion 180 of fitting 166. Planar portion 180 extends diagonally downward as a structural rib 182 which is reinforced by a vertically disposed reinforcement member 184, extending perpendicularly to rib 182.

Additional fittings 186 serve as pressure seals for blocker doors 168. Fittings 186 are each mounted by fasteners (not shown) to a diagonally extending planar portion 188 of a respective bracket 190. Brackets 190 each have a planar portion 192 which is secured to horizontal forward edge 162 by a respective fastener 194 extending through a hole therein and a corresponding hole in edge 162. Fasteners 194 may consist of titanium hi-locks having aluminum collars with integral steel washers. Brackets 190 also each have a planar radially outwardly extending portion 196 which serves to prevent bypass airflow leakage aft of guide vanes (not shown) disposed in region 98 above and parallel to outer surface 132 of inner bondment 44. These guide vanes (well known in the art) serve to help direct the flow of air, when the blocker doors are deployed, so as to produce reverse thrust.

Referring to FIG. 4, inner surface 152 of inner bondment 44 has a region of additional graphite/epoxy laminate layers just aft of sloping surface 154. A series of steps 198, for receiving planar portions 200 of a graphite/epoxy fittings 202 are formed by limiting the length of some of the edge layers of surface 152. Fitting 202 (which are secured to inner bondment 44 by respective titanium blind fasteners 204 of a type suitable for use in composites) increases in thickness so as to define respective steps 206 for receiving a fairing 208 and a flange of a blocker door. Fairing 208 provides a smooth passageway for air proceeding through toward the aft portion of inner bondment 44 when blocker doors 168 do not divert most of the airflow forward.

Referring to FIG. 3, FIG. 5, FIG. 16 and FIG. 17 three axially extending actuator supports 210 of graphite/epoxy composite material are integrally formed at selected locations about the circumference of outer surface 132 of inner bondment 44. Actuator supports 210 have at aft portions thereof, shoulder 140 and sloping surface 142 which, as discussed above, define the annular recess for receiving outer bondment 46. Fasteners 144 extend into inner bondment 44 as discussed above.

Figure 16:
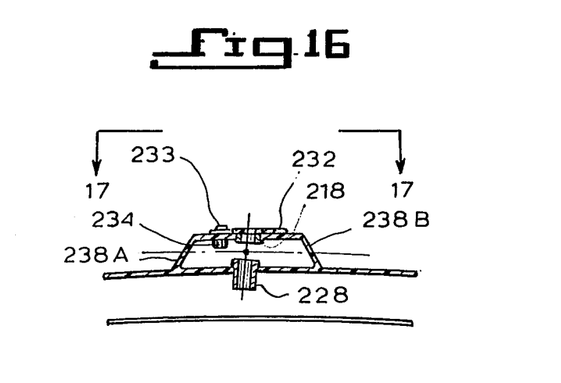
FIG. 16 is a fragmentary, cross-sectional view, taken generally along the lines 16—16, of FIG. 5.

Forward of fastener 144, actuator support 210 is formed as a channel having a substantially trapezoidal cross section, as shown in FIG. 3 and in more detail in FIG. 16. A respective rib 212 is provided between the lower wall 214 and the upper wall 216 of actuator support 210. Upper wall 216 has a hole formed therein to receive a steel bushing 218. A hole in inner surface 152 and core 52 is machined after bonding to receive a threaded insert and cap assembly 220, which includes an insert 222 and a cap 226. Cap 226 of assembly 220 has a cylindrical hole which receives a corresponding cylindrical projection of a second steel bushing 228 extending through lower wall 214 of actuator support 210. Steel bushing 228 has a threaded hole extending longitudinally thereof for receiving a threaded actuator pin 230 extending through bushing 218. As shown in FIG. 16 a sheet metal pin retainer 232 covers the portion of upper wall 216 in the vicinity of bushing 218 and is secured by a bolt 233 and plate nut 234 which receives the bolt.

Actuator pin 230 serves to connect inner bondment 44 to the actuator (not shown) by extending through a hole in the actuator perpendicular to the longitudinal axis of the actuator.

Insert 222 and cap 226 may be removed to provide access to actuator pin 230 to permit its removal for disassembly if cowl 42 is prevented from translating aft to the thrust reversing position, as the guide vanes (discussed above) block access to plate 232 when the transcowl is in its normal forward thrust position.

Figure 17:
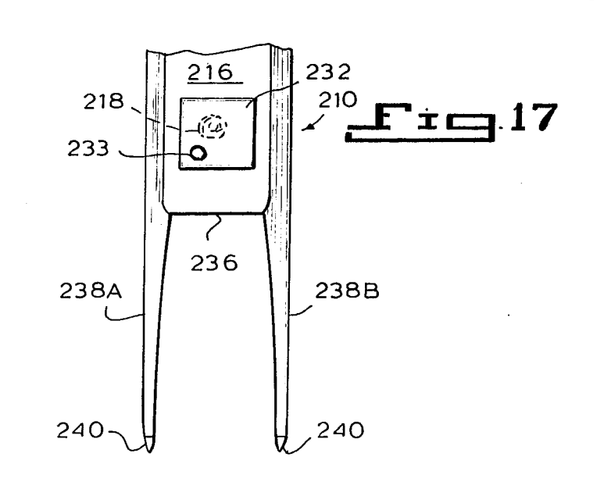
FIG. 17 is a fragmentary, plan view, taken along the lines 17—17, of FIG. 16.

With the exception of the hole for bushing 218, upper wall 216 of actuator support 210 is continuous until point 236, where it terminates, and side walls 238A and 238B continue forward until point 240 where side walls 238A and 238B terminate by curving into outer wall 132 of inner bondment 44. Side walls 238A and 238B thus effectively form a track for receiving an actuator (not shown) which moves forward and aft and therefore causes inner bondment 44 and therefore cowl 42 to translate.

Actuator supports 210 are formed by wrapping a mandrel (not shown) with additional pre-pregged graphite/epoxy cloth layers and placing the wrapped mandrel on the layer defining outer surface 132 of inner bondment 44 before curing and laying additional plies over the whole to encapsulate the assembly and provide additional shear area to take out actuator loads. After curing, the mandrel, having suitable draft and coated with a release agent, is simply pulled from the channel defining actuator support 210.

While upper walls 216 of actuator supports 210 are shown as being substantially continuous, it will be understood that openings may be formed therein to facilitate inspection.

The structural basis for the design of inner bondment 44 is that the composite materials are used to support stress as intended. Since the core does not readily support shear in the plane thereof, stresses are not transferred from the outer skin, which does support stresses in its plane, to the inner skin, and back to the outer skin, as is often the case with assemblies which use composite components as direct structural replacements for metal parts. Instead, the stress introduced in the outer surface 132 by blocker door hinge fittings 166 is distributed to and taken out by actuator supports 210, which handle stresses associated with a relatively large area of outer surface 132. These stresses are then transferred by bushings 218 and 228 and actuator pins 230 to the actuators.

As noted above, core 52, member 128, stiffeners 130 and the layers making up the surfaces of inner bondment 44 and actuator support 210 are assembled in a single bonding operation. The dimensions of the aft outlet area defined by surface 152 are fairly critical, and exhaust area tolerances must be maintained to within approximately two percent. Such tolerances are achieved by using a convex composite tool to define surfaces 152, 154 and 156, etc.

To adequately bond the outer surface laminates to core 52 aft of joining region 48, a concave programmed stiffness caul plate is used. The stiffness is minimum at the aft most edge of inner bondment 44 (at member 128) and increases in the direction of fasteners 144. At all points, sufficient stiffness is required to provide adequate bonding pressure without locally deforming the surface laminates to follow the contour of core 52 or crushing regions of core 52.

In the region in the vicinity of fasteners 144, a very stiff caul plate is used to precisely define the surfaces which mate with outer bondment 46. Forward of this region, a pressure bag is used, as only structural integrity and not surface finish is important, since the surface defined by the bag is not exposed to air flow.

As shown in FIG. 5, fairing 208 is attached directly to inside surface 152 of inner bondment 44 at a series of steps 242 in the outer laminates thereof by respective fasteners 204, as described above. Fairing 208 has a radially extending wall 246 which is secured to radial edge 164 of inner bondment 44 by a fastener 248 extending through corresponding holes in edge 164 and wall 246.

Figure 18:
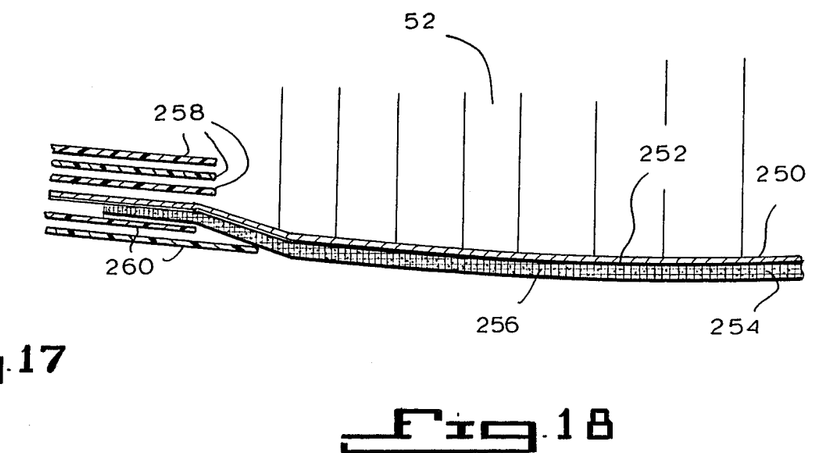
FIG. 18 is an enlarged, cross-sectional view of the acoustic liner material used in the present invention.

FIG. 18 illustrates, in cross section, the acoustically absorbing inner surface 152, of inner bondment 44 which together with core 52 serves to attenuate jet noise from the engine with which cowl 42 is used. An open weave graphite/epoxy cloth 250 has square opening approximately 1.5 mm × 1.5 mm defined by a first series of strips arranged parallel to each other and a second series of strips arranged parallel to each other, the first series of strips being perpendicular to the second series of strips. The strip may be spaced approximately every 3.2 mm in a woven pattern. Cloth 250 is bonded to core 54 by a reticulated adhesive 252 applied prior to the bonding operation which forms inner bondment 44 by heating and blowing so that the meniscus of adhesive 252 breaks at the opening between the strips. A tightly woven stainless steel mesh 254 having 125 to 250 strands per inch in a first direction and 700 to 750 strands in a second direction perpendicular to the first direction is bonded on to cloth 250 in the bonding operation by a spray adhesive 256 of carefully controlled viscosity and thickness applied prior to bonding. Mesh 254 is formed of a corrosion resistant alloy. While stainless steel is preferred because the acoustically absorbing material is then relatively stiff, it will be understood that for applications where stiffness is less important a fiberglass or Kevlar$^{TM}$ mesh may be used.

The edges of mesh 254 are secured between graphite/epoxy pre-pregged underlying edge layers 258 and overlying edge layer 260.

Since the acoustic material is advantageously applied during the single bonding operation used to produce inner bondment 44, rather than in a separate operation, it is necessary to perform quality control testing of the acoustic properties of the "liner" after bonding, when only one side is accessible. This is done using the two microphone Method and Apparatus for Determining Flow Resistance of Fully Assembled Acoustic Liners described in copending application Ser. No. 890,999, of Noe Arcas et al. filed July 25, 1986 and assigned to the assignee of the present invention.

Referring to FIG. 19 to FIG. 24, inner bondment 44 is connected to outer bondment 46 by fitting 100 (shown schematically in FIG. 13) fastened to both inner bondment 44 and outer bondment 46 by fasteners 262. The top edge 263 of inner bondment 44 is provided along the inner surface thereof with an extruded metallic fitting 264 having a series of slots therein to define a series of projecting members 265 each having a hole 266. Fitting 264, secured primarily by fasteners 264A, defines a first part of a one section hinge which pivots with respect to a series of projections 268 from a one-piece elongate member 270 received in a rectangular channel in a track member 272 having an elongate opening 274 to permit translation of projections 268. A rod or hinge pin 273 extends through holes 266 and corresponding holes (not shown) in projections 268. Track member 272 is part of the fixed structure of the aircraft engine. The arrangement of FIG. 19 to FIG. 24, simplifies the designer's stress calculations by providing a simple attachment of cowl 42 to the engine while (in concert with the translational support assembly for the outer bondment described above with respect to FIG. 14 and FIG. 15) permitting translation of cowl 42 when acted upon by the actuators (not shown).

The single hinge construction of the present invention is easy to align and eliminates the need for multiple hinge fixtures which must each be aligned to the axis of the hinge, and with respect to one another.

Upper edge 263 of inner bondment 44 is made up of 20 plies of graphite/epoxy tape at 0°, 4 plies at 90° and 8 plies at 45°, cured to a thickness of approximately 0.59 cm. As shown in FIG. 22 and FIG. 23, those fittings 264 located at positions along upper edge 276 opposite outer to inner bondment fitting 100 may be secured to edge 276 by fasteners 262.

A foam (ROHACELL TM ) insert 278 (FIGS. 20, 21 and 22) is provided at selected locations about the inner circumference of outer bondment 46 for aerodynamic (rather than structural) reasons. Foam insert 278 may be added after curing of bondment 46 and is covered by two skin layers 280 of graphite/epoxy cloth. A fairing 282 (FIGS. 20 and 21) having a recess 284 for a flange of a blocker door (not shown) is also provided for aerodynamic purposes. A fairing 286 (FIGS. 19, 22, 23 and 24) is again provided for aerodynamic purposes. Finally, a fairing 288 (FIG. 24) is provided for essentially the same reasons.

Various modifications of the invention will occur to one skilled in the art. For example, while the cowl 42 of the present invention is of a two-piece construction to facilitate inspection, repair and component replacement, for appropriate application a one-piece cowl may be designed to perform all of the functions of cowl 42.

Although shown and described in what are believed to be the most practical and preferred embodiments, it is apparent that departures from the specific method and designs described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

What is claimed is:

1. An aircraft cowl, comprising:
   an inner bondment formed as a one-piece composite structure;
   an outer bondment formed as a one-piece composite structure;
   fastening means for fastening said inner bondment to said outer bondment; and
   an acoustic attenuating liner on at least a portion of an inner surface of at least one of said inner bondment and said outer bondment.

2. The cowl of claim 1, wherein at least one of said inner bondment and said outer bondment has formed therein:
   mounting means for mounting said cowl to said aircraft.

3. The cowl of claim 1, further comprising mounting means for mounting said cowl to an aircraft, said mounting means having a first portion thereof affixed to said cowl, and a second portion mounted to said aircraft.

4. The cowl of claim 3, wherein said mounting means includes a one section hinge, a first part of said hinge being said portion affixed to said cowl, and a second part of said hinge being said portion mounted to said aircraft.

5. The cowl of claim 3, further comprising actuator attachment mean for actuators for translating said cowl, wherein said mounting means mounts said cowl to an engine of said aircraft so that said cowl can translate in an axial direction with respect to said engine in response to motion of said actuators.

6. The cowl of claim 1, wherein said acoustic attenuating liner is an integrally cured-in component of said one-piece composite structure.

7. The cowl of claim 1, wherein at least one of said inner bondment and said outer bondment comprises a constant density core.

8. The cowl of claim 1, wherein at least one of said inner bondment and said outer bondment has a tapered edge closure.

9. The cowl of claim 8, wherein said tapered edge closure comprises a honeycomb core having a tapered region at an edge thereof, at least one skin layer of composite material on each of opposite sides of said core, and a plurality of composite edge layers running parallel to and reinforcing said at least one skin layer by extending a predetermined distance from said edge.

10. The cowl of claim 9, wherein said edge layers are located between said core and said skin layers.

11. The cowl of claim 9, wherein said predetermined distance is smaller for layers located closer to said core.

12. The cowl of claim 1, further comprising actuator attachment means for actuators attached to said aircraft for moving said cowl with respect to said aircraft, said actuator attachment means projecting from an external surface of one of said inner bondment and said outer bondment and secured thereto so as to facilitate transmission of stresses over a substantial area of said external surface in the vicinity of said actuator attachment means.

13. The cowl of claim 12, wherein said actuator attachment means is secured to an outer external surface of said inner bondment.

14. An aircraft cowl as claimed in claim 1, wherein said acoustic attenuating liner comprises a corrosion-resistant honeycomb core, a corrosion-insulated perforated sheet on said honeycomb core, adhesive between said preforated sheet and said core for bonding said perforated sheet to said core, a mesh woven from corrosion-resistant metal on said perforated sheet, and additional adhesive between said mesh and said performated sheet for bonding said mesh to said perforated sheet, said additional adhesive having predetermined characteristics including a specific viscosity during curing.

15. An aircraft cowl, comprising:
at least one bondment formed as a one-piece composite structure having a honeycomb core and composite layers over at least one side of said core, said bondment having a tapered edge closure about at least a portion of the periphery thereof; and
an acoustic attenuating liner on at least a portion of an inner surface of said bondment.

16. The aircraft cowl of claim 15, wherein said core is of constant density.

17. The aircraft cowl of claim 15, wherein said tapered edge closure comprises a tapered edge region of said core, said region having an edge, at least one of said composite layers serving as a skin layer on each side of said core, and a plurality of composite edge layers running parallel to and reinforcing said at least one skin layer by extending a predetermined distance from said edge.

18. An aircraft cowl as claimed in claim 15, wherein said acoustic attenuating liner comprises a corrosion-resistant honeycomb core, a corrosion-insulated perforated sheet on said honeycomb core, adhesive between said perforated sheet and said core for bonding said perforated sheet to said core, a mesh woven from corrosion-resistant metal on said perforated sheet, and additional adhesive between said mesh and said perforated sheet for bonding said mesh to said performated sheet, said additional adhesive having predetermined characteristics including a specific viscosity during curing.

19. A method for manufacturing an aircraft cowl, comprising the steps of:
forming a first one-piece composite bondment;
forming a second one-piece composite bondment;
integrally curing and bonding an acoustic attenuating liner to at least one surface of one of said bondments; and
assembling said first one-piece composite bondment and said second one-piece bondment to form the cowl.

20. The method of claim 19, wherein at least one of said first one-piece composite bondment and said second one-piece composite bondment is formed in a single curing operation.

21. An acoustic attenuating liner, comprising
a corrosion-resistant honeycomb core;
a corrosion-insulated perforated sheet on said honeycomb core;
adhesive between said perforated sheet and said core for bonding said perforated sheet to said core;
a mesh woven from corrosion-resistant metal on said perforated sheet; and
additional adhesive between said mesh and said perforated sheet for bonding said mesh to said perforated sheet, said additional adhesive having predetermined characteristics including a specific viscosity during curing.

22. An acoustic attenuating liner as claimed in claim 21, wherein said perforated sheet comprises a graphite weave impregnated with epoxy.

23. An acoustic attenuating liner as claimed in claim 21, wherein said mesh comprises stainless steel wire.

24. An acoustic attenuating liner as claimed in claim 22, wherein said perforated sheet comprises an open weave of graphite impregnated with epoxy.

25. An acoustic attenuating liner as claimed in claim 22, wherein said perforated sheet comprises a first series of yarns substantially parallel to each other and a second series of yarns substantially parallel to each other and substantially perpendicular to said first series of yarns.

26. An acoustic attenuating liner as claimed in claim 23, wherein said stainless steel mesh has approximately 125 to 250 strands per inch in a first direction and approximately 700 to 750 strands per inch in a second direction substantially perpendicular to said first direction.

27. An acoustic attenuating liner as claimed in claim 25, wherein said perforated sheet has substantially square openings approximately 1.5 mm by 1.5 mm bounded by said first and second series of yarns.

* * * * *